Patented Oct. 23, 1928.

1,688,360

UNITED STATES PATENT OFFICE.

GEORGE N. STEIGERWALD, OF PHILADELPHIA, PENNSYLVANIA, ASSIGNOR TO THE UNION TRUST COMPANY, OF CLEVELAND, OHIO, A CORPORATION OF OHIO.

PROCESS OF WELDING.

No Drawing.    Application filed March 23, 1923.    Serial No. 627,117.

This invention relates to improvements in the art of welding articles of iron and steel, especially to a process for increasing the strength of a welded joint and particularly a seam welded joint in a railway track, and the resulting joint structure.

It is well known that the rapid cooling of the seam metal from high welding heat frequently causes the seam metal to crack while cooling and the seam metal, unless subjected to some further treatment, is frequently under internal strains which will cause the seam to break under repeated blows of passing traffic even if it does not show any fracture after it first has cooled. The invention relates particularly to means for improving the structure and ductility of the seam metal so it may have the same resistance to fractu e as the metal in the article being welded and to control and distribute internal stresses in the joint so as to eliminate rail breaks.

The process will be described as practiced in welding a fish plate to a track rail as disclosed in United States Reissue Letters Patent Nos. 14,137 and 14,245, although it is not limited in its application to such use.

The fish plate is placed in position adjacent to track rail and secured in place in any suitable manner,—for example, by bolts or rivets. The arc is then drawn and a weld is produced along the joint between the fish plate and the head or the base of the rail. Preferably additional metal is applied to the seam by means of a filler rod and this filler rod is thoroughly welded into the molten mass as the welding progresses in any well known manner, but preferably by using a carbon arc as the source of heat.

At the conclusion of this first welding, the seam may be more or less ragged in appearance and may contain numerous depressions due to variations in the arc and irregularity in the progress of the arc. Before the metal is cooled, according to this process, an additional amount of metal may be added over the seam just welded wherever desired or required, and which is still hot from the heat of welding, and this additional metal is then welded into the other seam metal and may be considered as a part of the seam as first welded. If desired, small pieces of filler rod may be placed over the seam metal wherever unusual depressions occur and these additional pieces of metal are then welded into the seam.

The arc then is caused again to traverse or retrace the same path taken in the original welding process without adding additional metal. During this second welding or retracing, it is not necessary that the crater shall be as deep as in the first operation, since the heat from the bottom of the crater will penetrate through all of the previously welded metal and into the bottom of the seam, thereby producing the desired fine grained structure when the metal solidifies a second time.

The retracing is performed preferably only once unless it is desirable to place more metal into depressions found in the seam. Preferably, also, the retracing commences as soon as the primary welding is finished and while the seam metal is still at a very high temperature but the seam may be retraced twice or even a greater number of times if desired.

It will be understood that the seam in the joint of a track rail is seldom less than 18" in length and the time required to weld the seam using a carbon arc is three to six minutes. The seam metal usually cools sufficiently to solidify from two to four inches behind the crater, consequently it is not only practical, but desirable to commence the retracing operation as soon as the primary welding is finished.

By means of this process I obtain a very fine grained nonporous metal in the seam that is entirely free from cracks and having a comparatively high degree of strength and ductility. The operation of retracing is readily performed without any changes or adjustment of apparatus or in the character of the arc. Substantially the same results will be obtained, however, if the amperage and voltage of the arc is somewhat reduced in the retracing operation, but this is not essential. Preferably, also, the crater is not as deep during the retracing as in the primary welding, but in various cases a crater of the same depth has been used in both operations without observing injurious effects. On the contrary the seam metal is always improved in structure and physical characteristics by the retracing of the arc and the remelting of the seam metal.

I have found that joints prepared according to my improved process show greatly increased results under fatigue tests over those in which the step of retracing is not followed, and that so-called "hair line cracks" and rail breaks due to internal stresses in the joint are substantially eliminated.

The retracing may be carried out in either direction, that is by causing the arc to follow the line of the seam from the end last molten to the end first molten or vice-versa.

It will be understood that changes and modifications within the knowledge and skill of those skilled in the art may be employed without departing from the spirit of my invention, the scope of which is defined by what is claimed.

What I claim is:

1. The process of welding articles of steel or iron which comprises placing the articles in substantial contact, welding a seam therebetween along the path of such contact by the use of a carbon arc, permitting the seam metal to solidify and while still heated retracing said seam with said carbon arc and remelting the surface seam weld metal and weld metal adjacent thereof.

2. The process of welding articles of steel or iron which comprises placing the articles in substantial contact, welding a seam therebetween along the path of such contact by the use of a carbon arc, permitting the seam metal to solidify and while still heated retracing said seam with said carbon arc and maintaining a somewhat longer arc during said retracing than was maintained during the original melting of the seam metal.

3. The process of welding rail joints which consists in abutting rail ends, placing joint bridging plates at either side of said rail ends with their longitudinal edges in contact with the heads and bases of the rails, respectively, forming welded seams along said lines of contact by melting the metal of the rails, fish plates and a suitable filler rod with heat applied from a carbon arc, and retracing said seam metal with said carbon arc and remelting the surface and seam weld metal adjacent thereto to relieve internal stresses and to eliminate cracks resulting during the freezing of the metal of said seam after the first application of said arc.

4. The process of welding rail joints which consists in abutting rail ends, placing joint bridging plates at either side of said rail ends with their longitudinal edges in contact with the heads and bases of the rails, respectively, forming welded seams along said lines of contact by melting the metal of the rails, fish plates and a suitable filler rod with heat applied from a carbon arc, and retracing said seam metal with said carbon arc to relieve internal strains and to eliminate cracks resulting during the freezing of the metal of said seam after the first application of said arc.

5. The process of welding ferrous articles which comprises placing the articles in substantial contact, welding a seam between said articles along the path of contact thereof whereby to integrally unite said articles, permitting the metal of said seam to solidify, and subsequently retracing said seam with a carbon arc with sufficient heat to melt the surface thereof and to relieve internal stresses and improve the characteristics of the metal of the body of said seam.

In testimony whereof I affix my signature.

GEORGE N. STEIGERWALD.